US005729352A

United States Patent [19]

Shibata et al.

[11] Patent Number: 5,729,352

[45] Date of Patent: Mar. 17, 1998

[54] METHOD OF MANFACTURING SUBSTRATE FOR ELECTROPHOTOGRAPHIC PHOTORECEPTOR AND ELECTROPHOTOGRAPHIC PHOTORECEPTOR

[75] Inventors: Junichi Shibata, Minami-ashigara; Arimichi Fukuda, Ashigawa-kami-gun, both of Japan

[73] Assignee: Fuji Xerox Co., Ltd., Tokyo, Japan

[21] Appl. No.: 785,276

[22] Filed: Jan. 21, 1997

[30] Foreign Application Priority Data

Jan. 24, 1996 [JP] Japan .................................... 8-010243

[51] Int. Cl.[6] ............................... H04N 1/29; G03G 5/00; H01F 7/06

[52] U.S. Cl. ......................... 358/300; 399/159; 29/602.1; 29/895.3

[58] Field of Search ............................ 358/300; 219/216; 299/159; 29/592.1, 602.1, 603, 895.3, 895.32, 895.33

[56] References Cited

U.S. PATENT DOCUMENTS

| | | | |
|---|---|---|---|
| 5,237,746 | 8/1993 | Aoki et al. | 29/895.32 |
| 5,321,889 | 6/1994 | Watanabe | 29/895.3 |

FOREIGN PATENT DOCUMENTS

| | | |
|---|---|---|
| A-2-37358 | 2/1990 | Japan . |
| A-5-27467 | 2/1993 | Japan . |

*Primary Examiner*—Eric Frahm
*Attorney, Agent, or Firm*—Oliff & Berridge, PLC

[57] ABSTRACT

When a metal strip continuously fed and made of stainless-steel, an aluminum alloy or a nickel alloy is bent followed by welding opposite ends of the metal strip to form a pipe and followed by grinding the pipe, the pipe is subjected to heat treatment after the pipe has been welded and before the pipe is ground. Annealing or normalizing adaptable to the type of the metal is selected as the heat treatment. As a result, work hardening can be relieved by the above processes. Moreover, generation of magnetism attributable to martensitic transformation generated in a portion, in which bending stress is concentrated, can be prevented. Thus, work hardening due to the bending operation during the process for forming the pipe can be relieved so that the following grinding operation is performed accurately. Therefore, generation of partial magnetism due to the bending operation can be prevented so that an excellent image can be formed.

20 Claims, 2 Drawing Sheets

METHOD OF MANFACTURING SUBSTRATE FOR ELECTROPHOTOGRAPHIC PHOTORECEPTOR AND ELECTROPHOTOGRAPHIC PHOTORECEPTOR

BACKGROUND OF THE INVENTION

1. Field of the Invention

The present invention relates to a method of manufacturing a substrate for an electrophotographic photoreceptor for use in an image processor, such as a copying machine and a printer, and to an electrophotographic photoreceptor having the substrate manufactured by the manufacturing method.

2. Description of the Related Art

A method of manufacturing a substrate for an electrophotographic photoreceptor for use in an image processor, such as a copying machine and a printer, has been known as disclosed in Japanese Patent Application Laid-Open (JP-A) No. 5-27467. The method has the steps of bending a metal strip, which is continuously supplied, into a cylindrical shape, and welding opposite ends of the cylindrical member into a pipe to form the substrate, in which the processes of drawing, correction, ironing, deep drawing, grinding, polishing, honing, electrolytic polishing and anodization are selectively combined after the pipe has been formed.

However, the conventional manufacturing method suffers from excessive work hardening attributable to welding, drawing, correction, ironing and deep drawing so that the grinding process cannot suitably be performed. Therefore, the range which is ground by one grinding operation is restricted, and the operation is repeated to obtain a required accuracy. It leads to a fact that an excessively large number of fabricating operations is required and the fabrication cost becomes high. What is worse, a portion, into which bending stress is concentrated most densely when the metal strip is bent, encounters martensitic transformation, causing the portion to be partially magnetized. When a photoreceptor layer is formed after the pipe has been subjected to other required fabricating processes as occasion demands, and the quality of a formed image is confirmed, the quality of the image is adversely affected by the magnetism above.

SUMMARY OF THE INVENTION

Accordingly, an object of the present invention is to provide a method of manufacturing a substrate for an electrophotographic photoreceptor which is capable of overcoming the problems experienced with the conventional structure, which can easily be ground and with which the quality of an image can be stabilized and to an electrophotographic photoreceptor having the substrate for the electrophotographic photoreceptor manufactured by the method.

That is, a method of manufacturing a substrate for an electrophotographic photoreceptor according to the present invention comprises the steps of: bending a metal strip, which is fed continuously; welding opposite ends of the metal strip to form the metal strip into a pipe; and grinding the pipe to form the pipe into the substrate, wherein the pipe is subjected to heat treatment after the pipe has been manufactured by welding and before the grinding operation is performed.

The heat treatment includes annealing, normalizing and the like which is selected to be adaptable to a metal employed to form the pipe, for example, stainless steel, a nickel alloy or an aluminum alloy. It is preferable that the thickness of the pipe to be subjected to the heat treatment is 0.2 mm to 0.7 mm.

As described above, the present invention arranged to perform the heat treatment is able to relieve work hardening (strain hardening) caused by the bending process during the process for forming the pipe. Thus, the grinding operation can efficiently and accurately be performed. Moreover, generation of partial magnetism due to the bending operation can be prevented so that an excellent image is formed without an adverse influence upon the magnetism.

DESCRIPTION OF THE PREFERRED EMBODIMENTS

Figure 1:
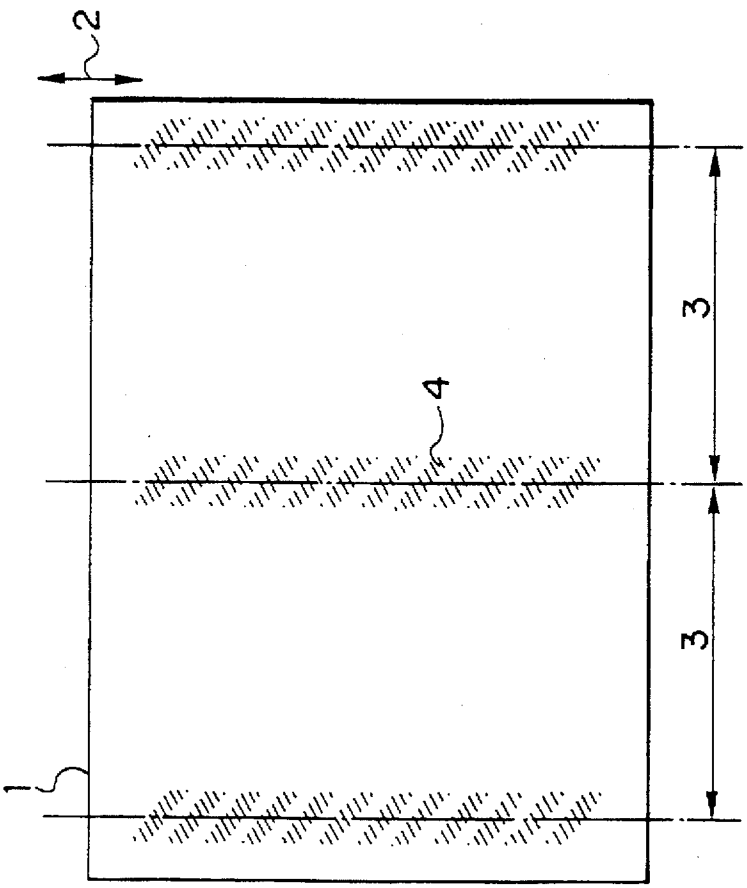
FIG. 1 is a diagram for explaining evaluation of an image formed by an electrophotographic photoreceptor using a substrate for an electrophotographic photoreceptor which has not been subjected to heat treatment.

The present invention will now be described. A method of manufacturing a substrate for an electrophotographic photoreceptor according to the present invention includes a heat treatment process, the conditions of which are arbitrarily selected to be adaptable to a metal material to be processed. The substrate for an electrophotographic photoreceptor is made of stainless steel, a nickel alloy or an aluminum alloy. When the metal is stainless steel or the aluminum alloy, annealing is performed as the heat treatment. When the metal is the nickel alloy, normalizing is performed as the heat treatment.

The annealing operation and the normalizing operation are performed under conditions shown in Table 1.

TABLE 1

| | | Heat Treatment | | | |
|---|---|---|---|---|---|
| | | Annealing | | Normalizing | |
| Alloy | Example | Heating Condition | Cooling Condition | Heating Condition | Cooling Condition |
| Stainless Steel | SUS304 | 1100–1200° C. | Cooling with Water (Rapid Cooling) | Omitted in General | |
| Ni Alloy | NCHR1 | | | about 800° C. | Cooling with Air or Cooling in the Furnace |
| Aluminum Alloy | 5052 | about 345° C. | Cooling with Air or Cooling in the Furnace | Omitted in General | |

When the metal material is annealed, it is preferable that the metal material be heated to a level not lower than the temperature at which the metal is recrystallized. In order to hold material members, the temperature cannot be raised to the melting point. Heating must be performed to a moment at which the overall body of the material member is heated to the annealing temperature. After the temperature has been raised to the annealing temperature, the temperature is not required to be maintained at the annealing temperature. Although the aluminum alloy is work-hardened during the process for forming the pipe similarly to the nickel alloy, martensitic transformation is not caused. Therefore, the annealing operation for the aluminum alloy is performed to relieve the work hardening.

The heat treatment may be performed by induction heating or a heating furnace. When the induction heating operation is performed, the pipe is heated by a heating coil. Since the heating operation is performed instantaneously, the heating means, comprising the heating coil, and a cooling means, comprising a water cooling apparatus, can be disposed adjacently. The foregoing structure is effective in annealing stainless steel or the like.

The means using the heating furnace is arranged to heat the pipe with combustion heat of butane gas or the like. Since the overall length of the heating furnace is too long to connect the cooling apparatus adjacently, the above-mentioned means may be combined with a cooling means, such as an air cooling means or a furnace cooling means which is employed when the nickel alloy is normalized or the aluminum alloy is annealed.

The above-mentioned heat treatment is performed after the pipe has been formed by bending and welding before the pipe is ground. It is preferable that the thickness of the metal strip be 0.2 mm to 0.7 mm. If the thickness of the metal strip is thinner than 0.2 mm, the pipe cannot easily be formed. Specifically, the roundness deteriorates and the pipe is bent excessively to be used practically. Moreover, there arise other problems in that the welding operation cannot be performed, thus the pipe cannot be welded and excessively great beads are generated. If the thickness of the metal strip is larger than 0.7 mm, a great force is required to bend the metal strip. Therefore, a considerably long machining line for forming the pipe is required. As a result, an excessively large plant investment is required and the welding operation cannot easily be performed.

According to the present invention, work hardening can be removed, martensitic transformation causing partial magnetization to be generated can be prevented and thus deterioration in the quality of an image attributable to the magnetism can be prevented when a stainless steel pipe is annealed. When a pipe made of the nickel alloy or the aluminum alloy is annealed, work hardening after the metal strip has been bent can be prevented. In this case, the grinding operation can easily and reliably be performed.

EXAMPLES

Examples of the present invention will now be described.

Example 1

A stainless steel strip having a width of 94.5 mm and a thickness of 0.7 mm and made of SUS304 was prepared. The stainless steel strip was continuously fed, and held by upper and lower rolls so that the stainless steel strip was formed into a cylindrical shape through plastic deformation. Then, opposite ends of the cylindrical stainless steel strip were TIG-welded so that a pipe having an outer diameter of 30.1 mm was formed. The pipe forming speed at this time was about 1.5 m/minute. A high-frequency electromagnetic induction heater (SH50 manufactured by Japan Electron Optics Laboratory Co., Ltd.) was disposed in an upstream position in the pipe forming line so that the formed pipe was heated to 1100° C. by the above-mentioned heater. Then, the pipe was rapidly cooled by pure water. Then, the pipe was cut to have a length of 253 mm by a cutter.

The thus-obtained pipe was ground to have an outer diameter of 30.0 mm by a center-less through feed method by using a grind stone (GC150) at a feeding speed of about 1.5 m/minute. Run-outs of the pipe before and after the grinding of the pipe are shown in Table 2. The run-outs were measured such that the two ends of the pipe were supported by V-blocks and the central portion of the pipe was measured (the above-mentioned method was employed in the following examples and comparative examples).

Five pipes were measured and results are shown in Table 2.

TABLE 2

| Sample No. | Run-out Before Grinding | Run-out After Grinding |
|---|---|---|
| 1 | 0.04 | 0.03 |
| 2 | 0.05 | 0.03 |
| 3 | 0.06 | 0.04 |
| 4 | 0.08 | 0.05 |
| 5 | 0.12 | 0.06 |

If a target run-out of the ground pipe is not greater than 0.06, there arises no problem in a case where the run-out of the pipe which has not been ground is 0.12. Since all of the run-outs after the grinding operation are 0.06 or less as shown in Table 2, it can be understood that the pipe can be ground accurately through the heat treatment.

Then, the cross sectional hardness of the pipe was measured. Results are shown in Table 3. The hardness was measured such that Vickers hardness (0.5 kg) conforming to JIS was measured.

TABLE 3

| Position from Welded Portion in the Circumferential Direction (°) | Hv |
|---|---|
| 150 | 194 |
| 225 | 190 |
| 300 | 198 |

As can be understood from Table 3, the Vickers hardness of all of the three portions of the welded portion in the circumferential direction is lower than that of Comparative Example 1. Thus, the increase in hardness due to the work hardening can be prevented.

Then, the pipe was immersed in a coating solution containing phthalocyanine for forming a charge generation layer and a coating solution for forming a charge transport layer containing benzidine compounds and polycarbonate resin by the method disclosed in Japanese Patent Application Laid-Open (JP-A) No. 2-37358. Thus, an electrophotographic photoreceptor was obtained.

Then, a resin flange was bonded to each of openings at the two ends of the thus-manufactured electrophotographic photoreceptor, and then the electrophotographic photoreceptor was mounted on a laser printer (1000/4R manufactured by NEC) so that the quality of an image was evaluated, and a high quality of an image was obtained.

Comparative Example 1

A stainless steel strip having a width of 94.5 mm and a thickness of 0.7 mm and made of SUS304 was prepared. The stainless steel strip was continuously fed, and held by upper and lower rolls so that the stainless steel strip was formed into a cylindrical shape through plastic deformation. Then, opposite ends of the cylindrical stainless steel strip were TIG-welded so that a pipe having an outer diameter of 30.1 mm was formed. The pipe forming speed at this time was about 1.5 m/minutes. Then, the pipe was cut to have a length of 253 mm by a cutter.

The thus-obtained pipe was ground to have an outer diameter of 30.0 mm by a center-less through feed method by using a grind stone (GC150) at a feeding speed of about 1.5 m/minute. Run-outs of the pipe before and after the grinding of the pipe are shown in Table 4. Five pipes were measured and results are shown in Table 4.

TABLE 4

| Sample No. | Run-out Before Grinding | Run-out After Grinding |
|---|---|---|
| 1 | 0.04 | 0.04 |
| 2 | 0.05 | 0.04 |
| 3 | 0.06 | 0.06 |
| 4 | 0.08 | 0.08 |
| 5 | 0.10 | 0.09 |

Since the run-out is not considerably changed through the above-mentioned grinding operation as shown in Table 4, a pipe which has less run-out after subjected to a grinding process by the center-less through feed method must be selected in a case where a target run-out of the ground pipe is not greater than 0.06. As can be understood from this, a pipe which is not subjected to the heat treatment cannot be ground satisfactorily.

Then, the cross sectional hardness of the pipe was measured. Results are shown in Table 5.

TABLE 5

| Position from Welded Portion in the Circumferential Direction (°) | Hv |
|---|---|
| 150 | 297 |
| 225 | 288 |
| 300 | 285 |

As can be understood from Table 5, the Vickers hardness (Hv) at each position in the circumferential direction of the pipe was higher as compared with Example 1 in which the heat treatment was performed. It means a fact that the pipe is hardened excessively due to work hardening if the pipe is not subjected to the heat treatment and thus the grinding operation cannot efficiently be performed.

Then, the pipe was immersed in a coating solution containing phthalocyanine for forming a charge generation layer and a coating solution for forming a charge transport layer containing benzidine compounds and polycarbonate resin by the method disclosed in Japanese Patent Application Laid-Open (JP-A) No. 2-37358. Thus, an electrophotographic photoreceptor was obtained.

Then, a resin flange was bonded to each of openings at the two ends of the thus-manufactured electrophotographic photoreceptor, and then the electrophotographic photoreceptor was mounted on a laser printer (1000/4R manufactured by NEC) so that the quality of an image was evaluated. As a result, stripes as shown in FIG. 1 were generated on a print at the pitch corresponding to the electrophotographic photoreceptor.

Referring to FIG. 1, reference numeral 1 represents a sheet, and 2 represents the axial direction of an electrophotographic photoreceptor. Reference numeral 3 represents a pitch of one rotation of the electrophotographic photoreceptor. As shown in FIG. 1, a strip pattern 4 corresponding to one rotation pitch 3 of the electrophotographic photoreceptor is formed. The stripe pattern 4 is formed in a portion, to which bending stress is concentrated most densely when the substrate for the electrophotographic photoreceptor is bent. Therefore, if no heat treatment is performed, the portion, to which bending stress is concentrated most densely, is partially magnetized due to the martensitic transformation. Thus, the stripe pattern 4 is formed on the image due to the influence of the magnetism.

Figure 2:
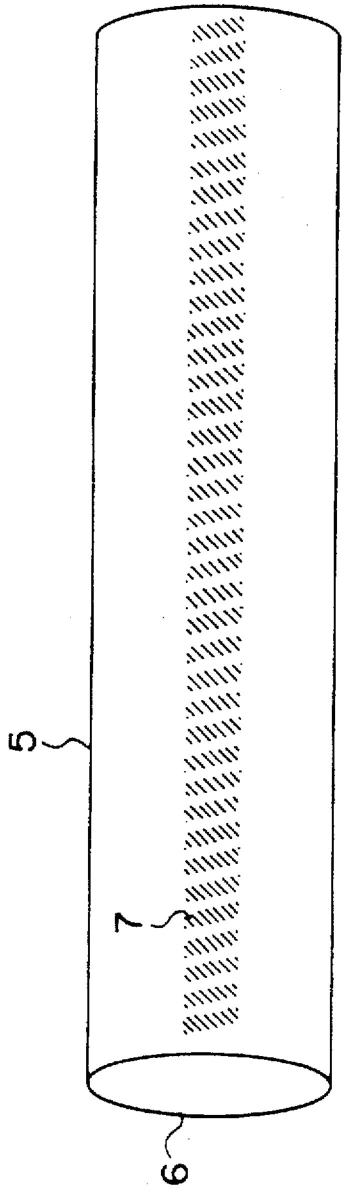
FIG. 2 is a diagram showing a state of adhesion of magnetic fluid to the substrate for the electrophotographic photoreceptor which has not been subjected to the heat treatment.

When magnetic fluid (N304 manufactured by Sigma High Chemical) was sprinkled to the raw pipe before it was ground, a pattern 7 was formed by the magnetic fluid allowed to adhere to the portion substantially opposite to a welded portion 6 of a pipe 5 shown in FIG. 2 in the circumferential direction of the pipe 5. Thus, a fact was confirmed that a portion, which was opposite to the welded portion 6 in the circumferential direction, which has not been subjected to the heat treatment and to which bending stress was concentrated most densely, was magnetized. Thus, the magnetic fluid was allowed to adhere to the pipe 5 because of the above-mentioned magnetism.

Example 2

A Ni alloy (NCHRl) strip having a width of 94.5 mm and a thickness of 0.7 mm was prepared. Similarly to Example 1, the strip was continuously fed, and held by upper and lower rolls so that the strip was formed into a cylindrical shape through plastic deformation. Then, opposite ends of the cylindrical strip were TIG-welded so that a pipe having an outer diameter of 30.11 mm was formed. The pipe forming speed at this time was about 1.5 m/minutes.

A high-frequency electromagnetic induction heater (SH50 manufactured by Japan Electron Optics Laboratory Co., Ltd.) was disposed in an upstream position in the pipe forming line so that the formed pipe was heated to 800° C. by the above-mentioned heater. Then, the pipe was gradually cooled in the atmosphere. Then, the pipe was cut to have a length of 253 mm by a cutter.

The thus-obtained pipe was ground to have an outer diameter of 30.0 mm by a center-less through feed method by using a grind stone (GC180) at a feeding speed of about 2 m/minute. Run-outs of the pipe before and after the grinding of the pipe are shown in Table 6. Five pipes were measured and results are shown in Table 6.

TABLE 6

| Sample No. | Run-out Before Grinding | Run-out After Grinding |
|---|---|---|
| 1 | 0.04 | 0.03 |
| 2 | 0.05 | 0.04 |
| 3 | 0.06 | 0.04 |
| 4 | 0.08 | 0.04 |
| 5 | 0.12 | 0.05 |

If a target run-out of the ground pipe is not greater than 0.06, there arises no problem in a case where the run-out of the pipe which has not been ground is 0.12. Since all of the run-outs after the grinding operation are 0.06 or less as shown in Table 6, it can be understood that the pipe can be ground accurately through the heat treatment.

Then, the cross sectional hardness of the pipe was measured. Results are shown in Table 7. The hardness was measured such that Brinell hardness conforming to JIS was measured.

TABLE 7

| Position from Welded Portion in the Circumferential Direction (°) | $H_B$ |
|---|---|
| 150 | 98 |
| 225 | 101 |
| 300 | 99 |

As can be understood from Table 7, the Brinell hardness ($H_B$) of all of the three portions of the welded portion in the circumferential direction is lower than that of Comparative Example 2. Thus, the increase in hardness due to the work hardening can be prevented.

Then, the pipe was immersed in a coating solution containing phthalocyanine for forming a charge generation layer and a coating solution for forming a charge transport layer including a charge transport layer containing benzidine compounds and polycarbonate resin by the method disclosed in Japanese Patent Application Laid-Open (JP-A) No. 2-37358. Thus, an electrophotographic photoreceptor was obtained.

Then, a resin flange was bonded to each of openings at the two ends of the thus-manufactured electrophotographic photoreceptor, and then the electrophotographic photoreceptor was mounted on a laser printer (1000/4R manufactured by NEC) so that the quality of an image was evaluated. As a result, an excellent quality of the image was realized.

Comparative Example 2

A Ni alloy (NCHR1) strip having a width of 94.5 mm and a thickness of 0.7 mm was prepared. The strip was continuously fed, and held by upper and lower rolls so that the strip was formed into a cylindrical shape through plastic deformation. Then, opposite ends of the cylindrical strip were TIG-welded so that a pipe having an outer diameter of 30.1 mm was formed. The pipe forming speed at this time was about 2 m/minutes. Then, the pipe was cut to have a length of 253 mm by a cutter.

The thus-obtained pipe was ground to have an outer diameter of 30.0 mm by a center-less through feed method by using a grind stone (GC180) at a feeding speed of about 2 m/minute. Run-outs of the pipe before and after the grinding of the pipe are shown in Table 8. Five pipes were measured and results are shown in Table 8.

TABLE 8

| Sample No. | Run-out Before Grinding | Run-out After Grinding |
|---|---|---|
| 1 | 0.04 | 0.04 |
| 2 | 0.05 | 0.04 |
| 3 | 0.06 | 0.05 |
| 4 | 0.08 | 0.07 |
| 5 | 0.10 | 0.09 |

Since the run-outs of the pipes are not considerably changed through the above-mentioned grinding operation as shown in Table 8, a pipe which has less run-out after subjected to a grinding process by the center-less through feed method must be selected in a case where a target run-out of the ground pipe is not greater than 0.06. As can be understood from this, a pipe which is not subjected to the heat treatment cannot be ground satisfactorily.

Then, the cross sectional hardness of the pipe was measured similarly to Example 2. Results are shown in Table 9.

TABLE 9

| Position from Welded Portion in the Circumferential Direction (°) | $H_B$ |
|---|---|
| 150 | 171 |
| 225 | 165 |
| 300 | 174 |

As can be understood from Table 9, the Brinell hardness at each position in the circumferential direction of the pipe is higher as compared with Example 2 in which the heat treatment was performed. It means a fact that the pipe is hardened excessively due to work hardening if the pipe is not subjected to the heat treatment and thus the grinding operation cannot efficiently be performed.

Example 3

An aluminum alloy (A5052) strip having a width of 94.5 mm and a thickness of 0.7 mm was prepared. The strip was continuously fed, and held by upper and lower rolls so that the strip was formed into a cylindrical shape through plastic deformation. Then, opposite ends of the cylindrical strip were TIG-welded so that a pipe having an outer diameter of 30.1 mm was formed. The pipe forming speed at this time was about 2.1 m/minutes. A high-frequency electromagnetic induction heater (SH50 manufactured by Japan Electron Optics Laboratory Co., Ltd.) was disposed in an upstream position in the pipe forming line so that the formed pipe was heated to 340° C. by the above-mentioned heater. Then, the pipe was rapidly cooled with pure water. Then, the pipe was cut to have a length of 253 mm by a cutter.

The thus-obtained pipe was ground to have an outer diameter of 30.0 mm by a center-less through feed method by using a grind stone (GC220) at a feeding speed of about 3.3 m/minute. Run-outs of the pipe before and after the grinding of the pipe are shown in Table 10. Five pipes were measured and results are shown in Table 10.

TABLE 10

| Sample No. | Run-out Before Grinding | Run-out After Grinding |
|---|---|---|
| 1 | 0.04 | 0.03 |
| 2 | 0.05 | 0.04 |
| 3 | 0.06 | 0.04 |
| 4 | 0.08 | 0.04 |
| 5 | 0.12 | 0.05 |

If a target run-out of the ground pipe is not greater than 0.06, there arises no problem in a case where the run-out of the pipe which has not been ground is 0.12. Since all of the run-outs after the grinding operation are 0.06 or less as shown in Table 10, it can be understood that the pipe can be ground accurately through the heat treatment.

Then, the cross sectional hardness of the pipe was measured. Results are shown in Table 11. The hardness was measured such that Brinell hardness (10/500) conforming to JIS was measured.

TABLE 11

| Position from Welded Portion in the Circumferential Direction (°) | $H_B$ |
|---|---|
| 150 | 110 |
| 225 | 108 |
| 300 | 111 |

As can be understood from Table 11, the Brinell hardness of all of the three portions of the welded portion in the circumferential direction is lower than that of Comparative Example 3. Thus, the increase in hardness due to the work hardening can be prevented.

Then, the pipe was immersed in a coating solution containing phthalocyanine for forming a charge generation layer and a coating solution for forming a charge transport layer including a charge transport layer containing benzidine compounds and polycarbonate resin by the method disclosed in Japanese Patent Application Laid-Open (JP-A) No. 2-37358. Thus, an electrophotographic photoreceptor was obtained.

Then, a resin flange was bonded to each of openings at the two ends of the thus-manufactured electrophotographic photoreceptor, and then the electrophotographic photoreceptor was mounted on a laser printer (1000/4R manufactured by NEC) so that the quality of an image was evaluated. As a result, an excellent quality of the image was realized.

Comparative Example 3

An aluminum alloy (A5052) strip having a width of 94.5 mm and a thickness of 0.7 mm was prepared. The strip was continuously fed, and held by upper and lower rolls so that the strip was formed into a cylindrical shape through plastic deformation. Then, opposite ends of the cylindrical strip were TIG-welded so that a pipe having an outer diameter of 30.1 mm was formed. The pipe forming speed at this time was about 2.1 m/minutes. Then, the pipe was cut to have a length of 253 mm by a cutter.

The thus-obtained pipe was ground to have an outer diameter of 30.0 mm by a center-less through feed method by using a grind stone (GC220) at a feeding speed of about 3.3 m/minute. Run-outs of the pipe before and after the grinding of the pipe are shown in Table 12. Five pipes were measured and results are shown in Table 12.

TABLE 12

| Sample No. | Run-out Before Grinding | Run-out After Grinding |
|---|---|---|
| 1 | 0.04 | 0.04 |
| 2 | 0.05 | 0.03 |
| 3 | 0.06 | 0.06 |
| 4 | 0.08 | 0.07 |
| 5 | 0.10 | 0.09 |

Since the run-out of the pipes is not considerably changed through the above-mentioned grinding operation as shown Table 12, a pipe which has less run-out after subjected to a grinding process by the center-less through feed method must be selected in a case where a target run-out of the ground pipe is not greater than 0.06. As can be understood from this, a pipe which is not subjected to the heat treatment cannot be ground satisfactorily.

Then, the cross sectional hardness of the pipe was measured similarly to Example 3. Results are shown in Table 13.

TABLE 13

| Position from Welded Portion in the Circumferential Direction (°) | $H_B$ |
|---|---|
| 150 | 170 |
| 225 | 172 |
| 300 | 168 |

As can be understood from Table 13, the Brinell hardness at each position in the circumferential direction of the pipe is higher as compared with Example 3 in which the heat treatment was performed. It means a fact that the pipe is hardened excessively due to work hardening if the pipe is not subjected to the heat treatment and thus the grinding operation cannot efficiently be performed.

What is claimed is:

1. A method of manufacturing a substrate for an electrophotographic photoreceptor, comprising the steps of:

bending a metal strip, which is fed continuously;

welding opposite ends of said metal strip to form said metal strip into a pipe; and grinding said pipe to form said pipe into said substrate, wherein said pipe is subjected to heat treatment after said pipe has been manufactured by welding and before said grinding operation is performed.

2. A method of manufacturing a substrate for an electrophotographic photoreceptor according to claim 1, wherein said heat treatment is a metal annealing step.

3. A method of manufacturing a substrate for an electrophotographic photoreceptor according to claim 2, wherein said metal is steel, an annealing temperature in said annealing step is higher than a recrystallizing temperature of said metal for forming said pipe and lower than a melting point of said metal.

4. A method of manufacturing a substrate for an electrophotographic photoreceptor according to claim 2, wherein said metal is stainless steel.

5. A method of manufacturing a substrate for an electrophotographic photoreceptor according to claim 4, wherein said step for annealing said stainless steel alloy is a rapid cooling step which is performed after said stainless steel alloy has been heated.

6. A method of manufacturing a substrate for an electrophotographic photoreceptor according to claim 2, wherein said metal is an aluminum alloy.

7. A method of manufacturing a substrate for an electrophotographic photoreceptor according to claim 6, wherein said step of annealing said aluminum alloy is a step of gradually cooling said aluminum alloy after said aluminum alloy has been heated.

8. A method of manufacturing a substrate for an electrophotographic photoreceptor according to claim 1, wherein said heat treatment is a metal normalizing step.

9. A method of manufacturing a substrate for an electrophotographic photoreceptor according to claim 8, wherein said metal is a nickel alloy.

10. A method of manufacturing a substrate for an electrophotographic photoreceptor according to claim 9, wherein said step of normalizing said nickel alloy is a step of gradually cooling said nickel alloy after said nickel alloy has been heated.

11. A method of manufacturing a substrate for an electrophotographic photoreceptor according to claim 1, wherein said welding is TIG welding.

12. A method of manufacturing a substrate for an electrophotographic photoreceptor according to claim 1, wherein the thickness of said metal strip is 0.2 mm to 0.7 mm.

13. An electrophotographic photoreceptor comprising: a substrate manufactured by bending a metal strip, which is fed continuously, by welding opposite ends of said metal strip to form said metal strip into a pipe and by grinding said pipe, wherein said substrate is formed by subjecting said pipe to heat treatment after said pipe has been manufactured by welding and before said grinding operation is performed.

14. An electrophotographic photoreceptor according to claim 13, wherein said heat treatment is a metal annealing step.

15. An electrophotographic photoreceptor according to claim 14, wherein said metal is steel, an annealing temperature in said annealing step is higher than a recrystallizing temperature of said metal for forming said pipe and lower than a melting point of said metal.

16. An electrophotographic photoreceptor according to claim 14, wherein said metal is stainless steel.

17. An electrophotographic photoreceptor according to claim 14, wherein said metal is an aluminum alloy.

18. An electrophotographic photoreceptor according to claim 13, wherein said heat treatment is a metal normalizing step.

19. An electrophotographic photoreceptor according to claim 18, wherein said metal is a nickel alloy.

20. An electrophotographic photoreceptor according to claim 13, wherein the thickness of said metal strip is 0.2 mm to 0.7 mm.

* * * * *